United States Patent [19]

Geiger et al.

[11] 3,871,351

[45] Mar. 18, 1975

[54] CYLINDER ARRANGEMENT HAVING A COMBUSTION AND A PRECOMBUSTION CHAMBER THEREIN AND A SEPARATE FUEL SUPPLY OR DOSING MEANS THEREFOR

[75] Inventors: Istvan Geiger; Gerd Decker, Wolfsburg, Germany

[73] Assignee: Volkswagenwerk Aktiengesellschaft, Wolfsburg, Germany

[22] Filed: July 9, 1973

[21] Appl. No.: 377,403

Related U.S. Application Data

[62] Division of Ser. No. 161,629, July 12, 1971.

[30] Foreign Application Priority Data

July 31, 1970 Germany............................ 2038097

[52] U.S. Cl......... 123/32 SP, 123/32 ST, 123/32 C, 123/33 VC, 123/191 S
[51] Int. Cl............................................ F02b 19/00
[58] Field of Search..... 123/33, 33 VC, 33 A, 33 D, 123/32 B, 32 C, 32 SP, 32 ST, 143 A, 48 D, 191 S

[56] References Cited
UNITED STATES PATENTS

| | | | |
|---|---|---|---|
| 2,758,577 | 8/1956 | Mallory................... | 123/32 SP |
| 2,849,922 | 9/1958 | Stillebroer................ | 123/32 ST |
| 3,174,470 | 3/1965 | Von Seggern et al........... | 123/32 ST |
| 3,406,667 | 10/1968 | Evans...................... | 123/32 ST |
| 3,543,736 | 12/1970 | Suzuki et al................ | 123/32 ST |

Primary Examiner—Charles J. Myhre
Assistant Examiner—Cort Flint
Attorney, Agent, or Firm—Ernest F. Marmorek

[57] ABSTRACT

In a combustion engine for motor vehicles a cylinder arrangement having a combustion chamber and a precombustion chamber in communication therewith and receiving the sparkplug with its electrodes, a first fuel supply or dosing arrangement opening into the combustion chamber and a second fuel supply or dosing arrangement opening into the precombustion chamber, an operating means associated with the first and second fuel dosing means and having a member following the different predetermined positions representative of the operative state of the first fuel supply or dosing arrangement, such member being constructed to define the operating state of the second fuel supply or dosing arrangement, wherein such member comprises a stem assuming different and predetermined axial positions and having a cross sectional profiling thereon, means coupled to the cross sectional profiling and defining the predetemined operating states of the second fuel dosing arrangement, and wherein further the cross sectional profiling is formed as a cam, an operating bar slidably mounted against the force of a spring transversely with respect to the stem, the camming being operatively coupled with such bar which in turn is operative coupled with the second fuel supply or dosing arrangement.

3 Claims, 1 Drawing Figure

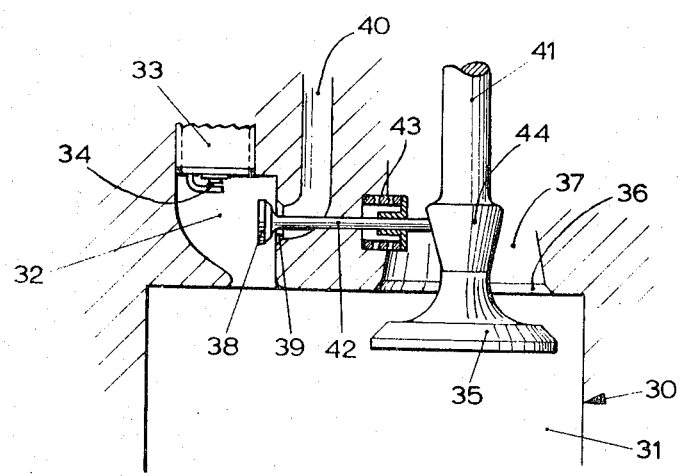

CYLINDER ARRANGEMENT HAVING A COMBUSTION AND A PRECOMBUSTION CHAMBER THEREIN AND A SEPARATE FUEL SUPPLY OR DOSING MEANS THEREFOR

This is a division of application Ser. No. 161,629, filed July 12, 1971.

FIELD OF THE INVENTION

The present invention relates to a cylinder arrangement having a combustion and a precombustion or ante-chamber communicating with the combustion chamber therein and wherein the precombustion chamber receives the electrodes of a spark-plug, a first fuel supply or dosing means for the combustion chamber and a second fuel supply or dosing means for the precombustion chamber and an operating device intercoupling the first and second fuel dosing means.

BACKGROUND OF THE INVENTION

The types of machines which, for example, have been described by Schlamann are said to have the advantage in motor vehicles in that the combustion chamber can be supplied by a relatively poor mixture and thereby a good fuel burning efficiency and a very advantageous exhaust gas combination is attained and, at the same time only the precombustion chamber which has a relatively small volume should be supplied with a more combustible, that is, with a much richer mixture.

A serious disadvantage associated with the practical operation of such machines resides in that a pair of separate fuel supply or dosing means and a pair of control devices for these supply means are required. The control devices must be designed to provide for the accurate timing of the supply to the precombustion chamber at a certain predetermined time instant, that is, shortly before the instant of the ignition.

BRIEF SUMMARY OF THE INVENTION

It is, therefore, an object of the present invention to provide an improved cylinder arrangement having the above-mentioned subdivision into a combustion and a precombustion chamber and a pair of separate fuel dosing or supply means for such chambers which, however, have a very simply constructed operating or control device, especially for the precombustion chamber.

In accordance with the present invention a cylinder arrangement for the combustion engine is characterized in that a member is provided which follows the different predetermined positions of the first fuel dosing means according to operating states thereof, and at the same time it is constructed as a device which defines the different operating states of the second fuel dosing means and serves as its actuating member.

Irrespective thereof that the fuel supply or dosing is performed by means of valves which supply a fuel mixed with air or by means of injection nozzles, the invention is just as well applicable to both types of supply means in that it requires that the movements of the parts of the first fuel supply or dosing means are used to control the second fuel supply or dosing means operating on the precombustion chamber. The invention starts out from the principle that the different operating states of the first fuel supply or dosing means can be used as a time reference for the actuation or closing of the second fuel supply or dosing means. By employing this principle according to the present invention, the operating device for the second fuel supply or dosing means becomes more simple in construction than arrangements which control both fuel dosing means independently.

Obviously there can be a long series of constructively different embodiments of the present invention. Thus, for instance, the control member can be a stem assuming different axial positions and have different cross sectional profiling, the axial movements or positions of which by employing additional coupling elements can be translated into operating states of the second fuel supply or dosing means. An essentially compact embodiment of this device is a construction in which an operating bar axially moves against the force of a spring transversely with respect to the cross sectionally profiled stem acting on it as a cam and which is coupled to the second fuel supply or dosing means. This embodiment is preferably used only when the space conditions within the cylinder arrangement allow its use and, as a matter of fact, they require that the fuel supply or dosing devices be constructed under an angle with respect to each other and, for example, both fuel supply or dosing means can be constructed as valves which carry a stem and the operating bar as valve shaft, a valve plate, and wherein a plane passing through the valve plates can be placed under an angle of less than 180° and preferably at an angle of 90° with respect to each other. Under these conditions the precombustion chamber in a cross sectional picture lies practically next to the suction conduit for the poor mixture.

There are obviously other constructive variations possible, those for example, wherein the force translation is performed by means of hydraulic or pneumatic arrangement.

BRIEF DESCRIPTION OF THE DRAWING

The invention will become more readily apparent from the following description of preferred embodiments thereof shown in the accompanying drawing, in which:

The FIGURE illustrates schematically, in elevational view, and partly in section, a purely mechanically operating device for the second fuel supply in which a stem of the first fuel supply is provided by a profile serving as a cam; and

DESCRIPTION OF THE PREFERRED EMBODIMENT

Before going into a detailed discussion of the preferred embodiments, it should be noted that in all illustrated embodiments it has been assumed that both fuel supply means are constructed by valves, notwithstanding the fact that a mixture supply is performed over a carburetor or a suction pipe injector. Obviously, the invention is successfully applied also to cases where injection nozzles are used with injection pumps.

In the embodiment illustrated in the FIGURE, the cylinder arrangement 1 comprises a combustion chamber 31 and a precombustion chamber 32 into which a spark-plug 33 with its electrode arrangement 34, protrudes. It is assumed that the fuel supply is performed by means of valves and the valve assigned to the combustion chamber 31 comprises essentially a valve plate 35 and a valve seat 36 to which again a suction conduit 37 is connected, while the precombustion chamber 32 is supplied by a further valve having a valve plate 38, a valve seat 39 coupled to a further suction conduit 40.

Both valve plates 35 and 38 are supported by a stem 41, 42, respectively, and according to the present invention only the stem 41 is under the effect of a cam. The valve stem 42, on the other hand, which is placed at a right angle with respect to the axis of the stem 41, is mounted in a slidable manner against the force of a spring 43. Said stem 42 is operated by a cone-shaped profile member 44 of the stem 41, and the profile member functions as a cam. The operation again is as follows: When the first inlet valve 35, 36 is fully opened also the valve 38, 39 becomes opened, while the latter valve becomes closed only when the valve 35, 36 is fully closed.

It is clear that the illustrated cross sectionally profiled member can be constructed also in other fashion and particularly in such a manner that time-wise a different actuation of the second fuel supply or dosing means for the precombustion chamber occurs. It is also possible to mount the stem 42 upwardly or downwardly movably in a resilient manner so that it becomes axially shifted only up or down and during the movements of the cross sectionally profiled member 44. Under this condition one could provide a divided or sectionalized stem 42, both parts of which are connected by means of a transversely running axle. As a result, one could attain a singular opening of the valve 38, 39 only during the closing or opening of the valve 35, 36. In the first case one could approximate more closely the instant of the ignition.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

Having thus described the invention, what we claim as new and desire to be secured by Letters Patent, is as follows:

1. In a combustion engine for motor vehicles, a cylinder arrangement comprising a combustion chamber, a precombustion chamber in communication with said combustion chamber, spark-plug means having electrodes in communication with said precombustion chamber, a first fuel supply or dosing means associated with said combustion chamber and a second fuel supply or dosing means associated with said precombustion chamber, said first fuel supply or dosing means comprising a member having a stem operable for assuming different predetermined axial positions representative of the operating states of the first fuel supply or dosing means, said stem including a portion having cross sectional profiling formed as a cam, and operating means associated with both said member and said second fuel supply or dosing means, said operating means comprising a spring means and an operating bar slidably mounted against the force of said spring means transversely with respect to said stem, said cam being operatively coupled to said bar, said bar being operatively coupled to said second fuel supply or dosing means.

2. The cylinder arrangement as claimed in claim 1, wherein said first and second fuel supply or dosing means comprise valve means, said operating bar comprising the shaft of said valve means, said valve means comprising valve plate means, the valve plate means of said first and second fuel dosing means being mounted at an angle less than 180° with respect to each other.

3. The cylinder arrangement as claimed in claim 1, wherein said valve plate means define an angle of about 90° with respect to each other.

* * * * *